(12) United States Patent
Kohno et al.

(10) Patent No.: US 7,320,658 B2
(45) Date of Patent: Jan. 22, 2008

(54) ROTATING SHAFT SUPPORT APPARATUS AND DIFFERENTIAL GEAR UNIT

(75) Inventors: Tetsuya Kohno, Okazaki (JP); Hitoshi Ohnishi, Nishikamo-gun (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 79 days.

(21) Appl. No.: 10/855,468

(22) Filed: May 28, 2004

(65) Prior Publication Data

US 2004/0242363 A1    Dec. 2, 2004

(30) Foreign Application Priority Data

May 30, 2003    (JP)    ............................. 2003-155653

(51) Int. Cl.
*F16H 57/04*    (2006.01)
(52) U.S. Cl. ..................................... 475/160; 74/606 A
(58) Field of Classification Search ................ 475/159, 475/160; 184/6.16, 6.18, 6.12; 74/607, 74/606 A
See application file for complete search history.

(56) References Cited

U.S. PATENT DOCUMENTS

| | | | | |
|---|---|---|---|---|
| 1,159,504 A | * | 11/1915 | Krogh | .......................... 184/6.18 |
| 2,229,237 A | * | 1/1941 | Brenkert | .......................... 184/6 |
| 2,306,608 A | * | 12/1942 | Hubacker | .................... 418/63 |
| 3,049,285 A | * | 8/1962 | Doeg | .......................... 417/372 |
| 4,236,879 A | * | 12/1980 | Abe | .............................. 417/368 |
| 5,667,372 A | * | 9/1997 | Hwang et al. | .................. 418/63 |
| 6,053,835 A | * | 4/2000 | Shibazaki et al. | ........... 475/160 |
| 6,059,683 A | * | 5/2000 | Teraoka et al. | .............. 475/160 |
| 6,413,183 B1 | * | 7/2002 | Ishikawa et al. | ............. 475/160 |

FOREIGN PATENT DOCUMENTS

| | | |
|---|---|---|
| JP | 2-38029 | 2/1990 |
| JP | 8-170717 A | 7/1996 |
| JP | 8-170718 | 7/1996 |
| JP | 8-187552 | 7/1996 |

* cited by examiner

*Primary Examiner*—Charles A. Marmor
*Assistant Examiner*—Justin K. Holmes
(74) *Attorney, Agent, or Firm*—Oblon, Spivak, McClelland, Maier & Neustadt, P.C.

(57) ABSTRACT

In a lubrication groove, which is formed in an insertion hole into which is inserted an output shaft, and which winds around the circumference of the insertion hole while advancing in the axial direction of the insertion hole, there is a portion that is farther to the outside than a perpendicular plane that is perpendicular to a center plane of a differential case on which lie the axial centers of the insertion hole and a pinion gear shaft, the perpendicular plane including a line of intersection of the center plane and the insertion hole. That portion is a perpendicular groove portion which is parallel to a plane that is perpendicular to the axial center of the insertion hole. Accordingly, when extracting a core for forming the insertion hole and the lubrication groove from a die, projections formed on the core for forming the lubrication groove will not interfere with the die. As a result, it is possible to form the lubrication groove during casting of the differential case using that core.

6 Claims, 7 Drawing Sheets

ROTATING SHAFT SUPPORT APPARATUS AND DIFFERENTIAL GEAR UNIT

INCORPORATION BY REFERENCE

The disclosure of Japanese Patent Application No. 2003-155653 filed on May 30, 2003, including the specification, drawings and abstract is incorporated herein by reference in its entirety.

BACKGROUND OF THE INVENTION

1. Field of the Invention

The invention relates to a rotating shaft support apparatus which supports rotating shafts via a structure in which they can rotate relative to one another, such as a differential gear unit that transmits torque to left and right output shafts supported via a structure in which they can rotate relative to one another. More specifically, the invention relates to a lubricant groove for supplying lubricant between a case and rotating shafts supported via a structure that allows them to rotate relative to one other in the case.

2. Description of the Related Art

As an example of a rotating shaft support apparatus that has a case which supports rotating shafts via a structure in which they are able to rotate relative to one another, a differential gear unit is known that transmits rotational driving force, and distributes torque, of a differential case to left and right side gears arranged about a rotational axis of the differential case via pinion gears housed in the differential case. The differential case of this kind of differential gear unit has insertion holes into which output shafts are fit and inside which lubrication grooves for supplying lubricant are often provided.

For example, FIG. 1 of JP(A) 8-170718 shows a spiral-shaped lubrication groove. Forming the lubrication groove in a spiral is advantageous in that it enables the lubricant to travel in the axial direction by the rotational force of the output shafts. Because of this advantage, spiral-shaped lubrication grooves are frequently employed.

The spiral-shaped lubrication grooves, however, are unable to be made during casting of the differential case. This is because even if a core having a spiral projection corresponding to the spiral groove were to be molded, the lubrication groove formed in the die would interfere with the spiral projection formed on the core when the core is moved in a direction perpendicular to the mold to extract it therefrom, resulting in undercutting of the spiral projection. Therefore, the spiral lubrication groove must be machined out after the casting process, which increases man-hours and thus manufacturing costs.

SUMMARY OF THE INVENTION

In view of the foregoing problems, this invention thus provides a rotating shaft support apparatus that is inexpensive to manufacture, in which a lubrication groove that enables lubricant to travel in the axial direction by rotational force of a shaft is formed in a case that supports rotating shafts via a structure in which they can rotate relative to one another.

A first aspect of the invention relates to a rotating shaft support apparatus that has a case which has an insertion hole into which a rotating shaft can be inserted, and which supports the rotating shaft via a structure in which the rotating shaft are rotatable relative to the case. A lubrication groove that winds around the circumference of the insertion hole while advancing in the axial direction of the insertion hole is formed in the insertion hole. The lubrication groove has at least a perpendicular groove portion which i) is farther to the outside than a perpendicular plane that is perpendicular to a center plane of the case on which lies the axial center of the insertion hole, the perpendicular plane including a line of intersection of the center plane and the insertion hole, and ii) is parallel to a plane which is perpendicular to the axial center of the insertion hole.

According to a first aspect of the invention, a core is used to cast the case. A die is used to cast the core. This die is separated into an upper die and a lower die by a plane corresponding to the center plane of the case, which includes the axial center of the insertion hole and which lies between an abutment surface of the upper die and a corresponding abutment surface of the lower die. When the core is moved perpendicularly with respect to the abutment surfaces of the upper and lower dies in order to extract it from the die, the core is able to be extracted from the die without a projection, which was formed on the core in order to form the lubrication groove, interfering with the lubrication groove formed in the die. Accordingly, using this core when casting the case enables a groove to be formed which allows lubricant to travel in the axial direction by the rotational force of the shaft, thereby reducing manufacturing costs.

The invention can be applied to a differential gear unit. That is, the differential gear unit has a differential case which has an insertion hole into which is fit an output shaft, and which revolves around the axial center of the insertion hole. The differential gear unit transmits rotational driving force, and distributes torque, of the differential case to left and right side gears arranged about the rotational axis of the differential case via a pinion gear housed in the differential case. The differential gear unit is characterized in that a lubrication groove that winds around the circumference of the insertion hole while advancing in the axial direction of the insertion hole is formed in the insertion hole; and the lubrication groove has a perpendicular groove portion which i) is farther to the outside than a perpendicular plane that is perpendicular to a center plane of the case on which lies the axial center of the insertion hole, the perpendicular plane including a line of intersection of the center plane and the insertion hole, and ii) is parallel to a plane which is perpendicular to the axial center of the insertion hole.

Because the perpendicular groove portion is the only portion where lubricant is not able to be carried in the axial direction when the shaft rotates, it is necessary to form, in addition to the perpendicular groove portion, a groove portion that is not parallel to a perpendicular plane that is perpendicular to the axial center of the insertion hole in the lubrication groove in order to enable the lubricant to travel in the axial direction. As described below, this groove portion may be formed at a portion that does not intersect the center plane or at a portion that does intersect the center plane (or at a portion that contacts the center plane) or at both of those portions.

When a groove portion that intersects a perpendicular plane that is perpendicular to the axial center of the insertion hole is formed at a portion that does not intersect the center plane, the lubrication groove is structured such that a plurality of the perpendicular groove portions are formed at different locations in the axial direction of the insertion hole, and a first connecting groove portion formed at a portion that does not intersect the center plane connects the plurality of perpendicular groove portions together. Accordingly, the lubricant is able to be carried in the axial direction by the rotational force of the shaft.

Also, when a groove portion that intersects a perpendicular plane that is perpendicular to the axial center of the insertion hole is formed at a portion that does intersect the center plane (or at a portion contacting the center plane), the perpendicular groove portion is structured such that one end thereof lies on the center plane, and a second connecting groove portion, which connects the ends, on the center plane side, of adjacent perpendicular groove portions together and in which an area of a cross-section parallel to the center plane becomes smaller farther away from the center plane, is formed in the lubrication groove. This structure as well enables the lubricant to travel in the axial direction by rotational force of the shaft. Also, because the area becomes smaller the farther away the second connecting groove portion is from the center plane, the portion that corresponds to the second connecting groove portion of a projection formed on the core does not interfere with the second connecting groove portion formed in the die for molding the core when the core is moved relative the die in a direction perpendicular to the center plane in order to extract the core from the die, which separates into the upper die and the lower die at the center plane. Accordingly, using this core when casting the case enables a lubrication groove having the second connecting groove portion to be formed at the same time the case is cast.

Forming the first connecting groove portion at the portion that does not intersect the center plane and forming the second connecting groove portion at the portion that does intersect the center plane (or the portion that contacts the center plane) makes it easier for lubricant to be carried in the axial direction by rotation of the shaft.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF THE PREFERRED EMBODIMENTS

Figure 1:
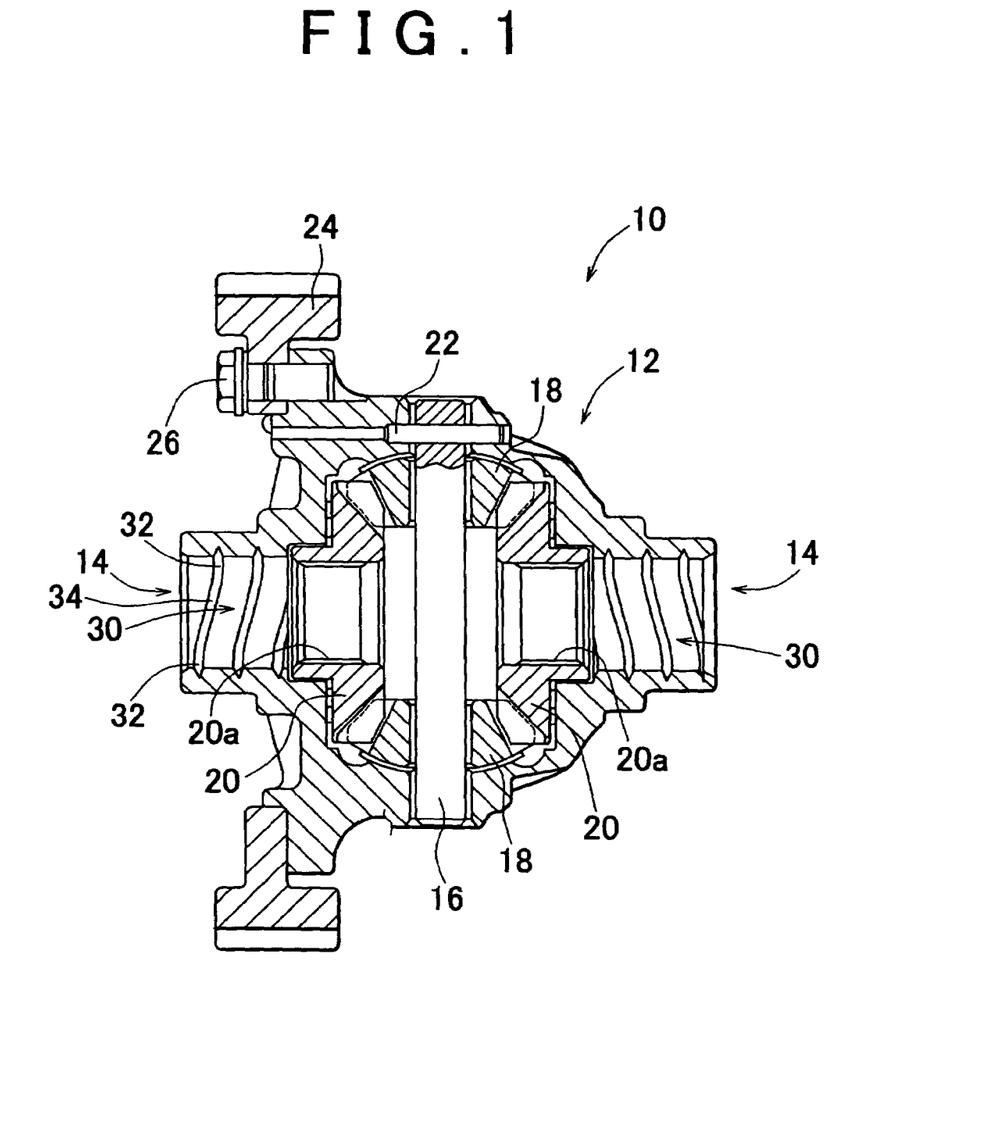
FIG. 1 is a sectional view of a differential gear unit according to a first exemplary embodiment of the invention, in which a differential case is shown cut along a center plane that includes the axial center of an insertion hole and the axial center of a pinion gear shaft.

In the following description and the accompanying drawings, the present invention will be described in more detail in terms of exemplary embodiments. FIG. 1 is a sectional view of a differential gear unit 10 according to a first exemplary embodiment of the invention, in which a differential case 12 is shown cut along a plane (hereinafter, this plane will be referred to as "center plane") that includes the axial centers of insertion holes 14 and a pinion gear shaft 16.

The insertion holes 14 each receive an output shaft, not shown, such that the output shafts are rotatable relative to one another. The pinion gear shaft 16 supports a pair of pinion gears 18. The insertion holes 14 are both perpendicular to the pinion gear shaft 16. The pinion gear shaft 16, together with the pair of pinion gears 18 that are supported by the pinion gear shaft 16 and a pair of side gears 20 that are both meshed with the pair of pinion gears 18, are housed in the center of a differential case 12.

Also housed in the differential case 12 is a shaft fixing pin 22 which passes through the pinion gear shaft 16 in the radial direction at a location to the outside of one of the pinion gears 18 so as to prohibit the pinion gear shaft 16 from moving in the axial direction.

Also, a ring gear 24 is abutted against one side face (the side face on the left side in FIG. 1) of the differential case 12 so as to be concentric with the side gears 20. The ring gear 24 is fixed to the differential case 12 by a bolt 26 so that the differential case 12 revolves around the axial center of the side gears 20 together with the ring gear 24. When the differential case 12 revolves around the axial center of the side gears 20, rotational driving force of the differential case 12 is transmitted, and the torque distributed, to the side gears 20 via the pinion gears 18.

The insertion holes 14 have the same axial center as that of the side gears 20. One end of each insertion hole 14 opens to a side face of the differential case 12, and the other end of each insertion hole 14 opens to a shaft hole 20a provided in the center of a corresponding one of the side gears 20. Further, a single lubrication groove 30 is formed in each of the left and right insertion holes 14. One lubrication groove 30 winds around the circumference of one of the insertion holes 14 while advancing from one end to the other of the respective insertion holes 14. For the sake of simplicity, the following description will refer to the lubrication grooves 30, insertion holes 14, and output shafts in the singular.

Portions of the lubrication groove 30 that intersect with the center plane are perpendicular groove portions 32 that are perpendicular to the center plane (i.e., that are perpendicular to the surface of the paper on which the drawing is shown). The perpendicular groove portions 32 are all formed at different positions in the axial direction of the insertion hole 14. First connecting groove portions 34 that connect adjacent perpendicular groove portions 32 are formed at the remaining portions of the lubrication groove 30, i.e., the portions that do not intersect with the center plane.

Figure 2A:
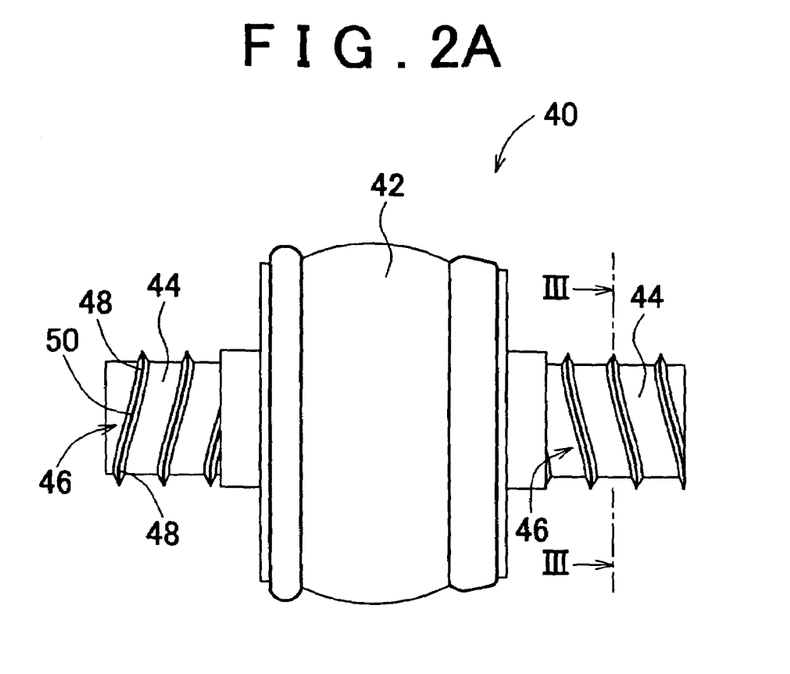
FIG. 2A is a plan view of a core used in casting the differential case shown in FIG. 1.
Figure 2B:
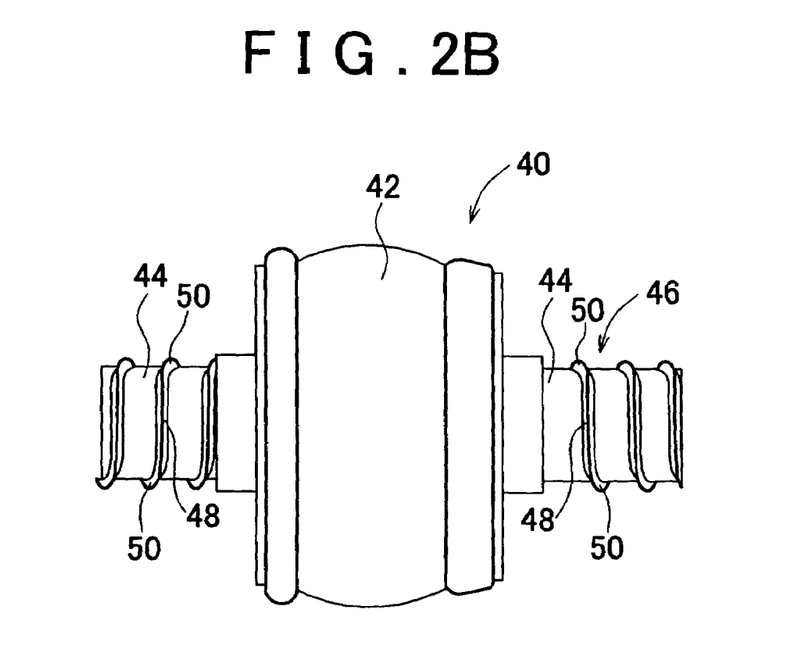
FIG. 2B is a front view of the same.

FIG. 2A is a plan view of a core 40 used in casting the differential case 12, and FIG. 2B is a front view of the same. The core 40 has a center portion 42 and cylindrical portions 44. The center portion 42 corresponds to the space in which the pinion gears 18 and the side gears 20 and the like are housed. The cylindrical portions 44 protrude from each side face of the center portion 42 and are used to form the insertion holes 14 in the differential case 12. A projection 46 for forming the lubrication groove 30 is formed on each cylindrical portion 44. This projection 46 includes perpendicular projecting portions 48 that are able to fit into the perpendicular groove portions 32 of the lubrication groove 30, and first connecting projecting portions 50 that are able to fit into the first connecting groove portions 34 of the lubrication groove 30.

Figure 3:
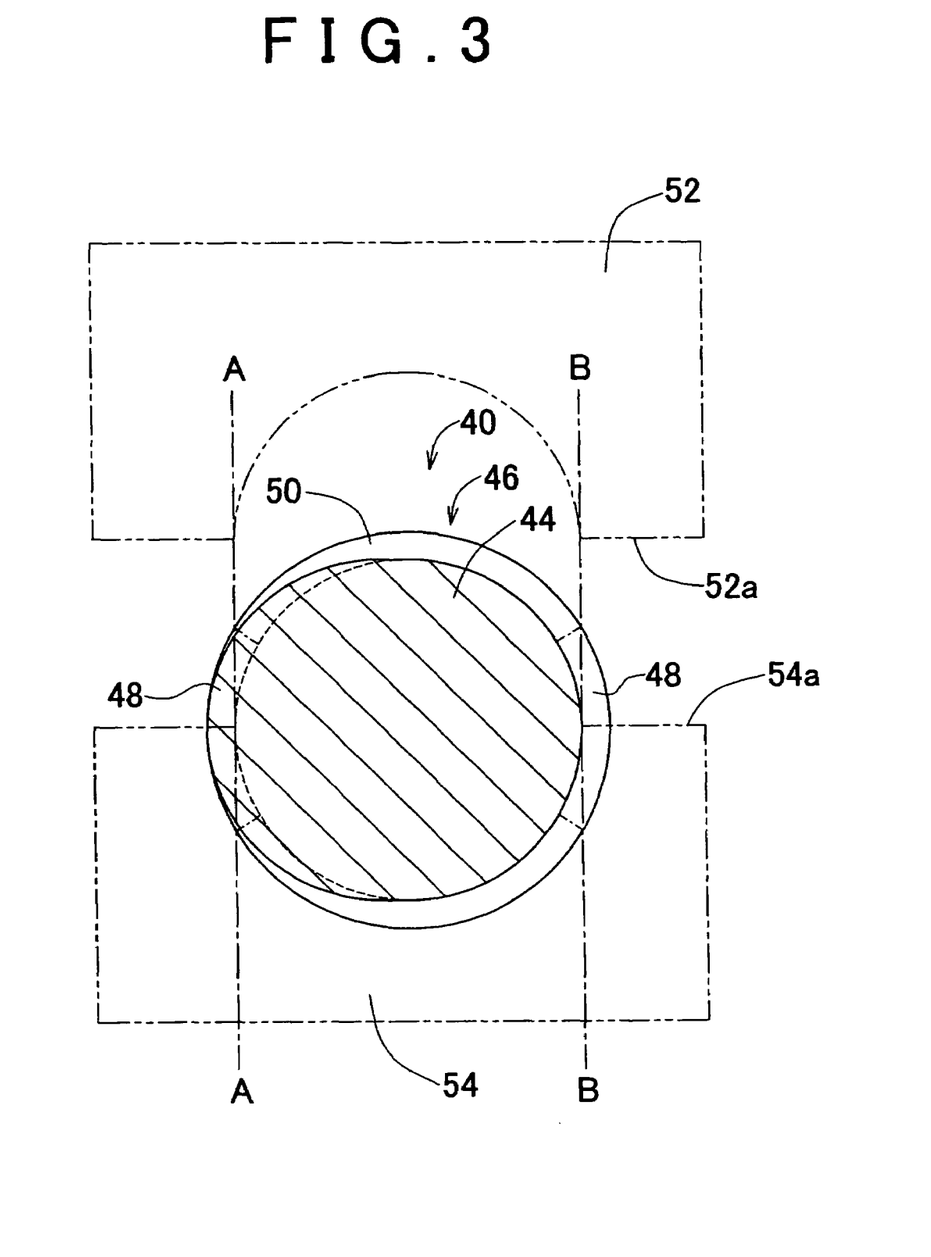
FIG. 3 is a sectional view of a portion of the core taken along line III-III in FIG. 2.

FIG. 3 is a sectional view of a portion of the core taken along line III-III in FIG. 2. The chain double-dashed lines in FIG. 3 indicate an upper die 52 and a lower die 54 both used in molding or casting the core 40. In the drawing, the upper die 52 is shown having been moved perpendicularly upward, with respect to an abutment surface 52a of the upper die 52, from a position in which it fits with the core 40. The lower die 54 is shown with the core 40 fitted therein. During molding or casting, the abutment surface 52a of the upper die 52 and an abutment surface 54a of the lower die 54 are abutted against one another. During extraction, the abutment surface 52a of the upper die 52 and the abutment surface 54a of the lower die 54 are separated from one another. Although not shown, the insertion holes 14 and the lubrication grooves 30 and the like similar to those formed in the differential case 12 are also formed in the pair of upper and lower dies 52 and 54.

Lines A-A and B-B are perpendicular to a plane on which the abutment surface 54a of the lower die 54 lies, and indicate planes that contact the cylindrical portions. The perpendicular projecting portions 48 are formed so as to include portions that are farther to the outside than the planes indicated by lines A-A and B-B shown in FIG. 3. Also, the plane on which the abutment surface 54a lies corresponds to the center plane in FIG. 1, and lines A-A and B-B correspond to perpendicular planes that are perpendicular to that center plane and which include the lines of intersection of that center plane and the insertion holes 14. Accordingly, the lubrication groove 30 formed by the core 40 has portions that are farther to the outside than the perpendicular planes that are perpendicular to the center plane and which include the lines of intersection of the center plane and the insertion holes 14. These portions are the perpendicular groove portions 32.

If the projections 46 were to interfere with the dies 52 and 54 when the upper die 52 is moved so as to fit with the core 40, i.e., moved downward in FIG. 3, that interference would be at the portions that are farther to the outside than the planes shown by lines A-A and B-B in FIG. 3, which means the first connecting projecting portions 50 would not interfere with the die 52 and 54. Further, because the portions farther to the outside than the planes shown by lines A-A and B-B in FIG. 3 are the perpendicular projecting portions 48 in this exemplary embodiment, they will not interfere with the dies 52 and 54 when the upper die 52 is moved perpendicularly upward with respect to the abutment surface 52a and the lower die 54 is moved perpendicularly downward with respect to the abutment surface 54a. Accordingly, the core 40 can be extracted from the dies 52 and 54 without undercutting of the projections 46.

As described above, according to the exemplary embodiment, the core 40 is used to cast the differential case 12. A die is used to cast the core 40. This die is separated into an upper die 52 and a lower die 54 by a plane corresponding to the center plane of the differential case 12, which includes the axial center of the insertion hole 14 and which lies between an abutment surface 52a of the upper die 52 and a corresponding abutment surface 54a of the lower die 54. When the core 40 is moved perpendicularly relative to the abutment surfaces 52a and 54a of the upper and lower dies 52 and 54 in order to extract the core 40 from the die, it is able to be extracted from the die without a projection 46, which had been formed on the core 40 in order to form the lubrication groove 30, interfering with the lubrication groove 30 formed in the die. Accordingly, using this core 40 when casting the differential case 12 enables a groove to be formed which allows lubricant to travel in the axial direction by the rotational force of the shaft, thereby reducing manufacturing costs.

Also according to the exemplary embodiment, the lubrication groove 30 is structured such that the plurality of perpendicular groove portions 32 are all formed at different positions in the axial direction of the insertion hole 14 and the first connecting groove portions 34 formed at the portions that do not intersect the center plane connect the plurality of perpendicular groove portions 32 together. This structure enables the lubricant to travel in the axial direction by the rotational force of the output shafts.

Next, a second exemplary embodiment of the invention will be described. In the following description, parts of the structure that are the same as those in the first exemplary embodiment will be denoted by the same reference characters and descriptions thereof will be omitted.

Figure 4:
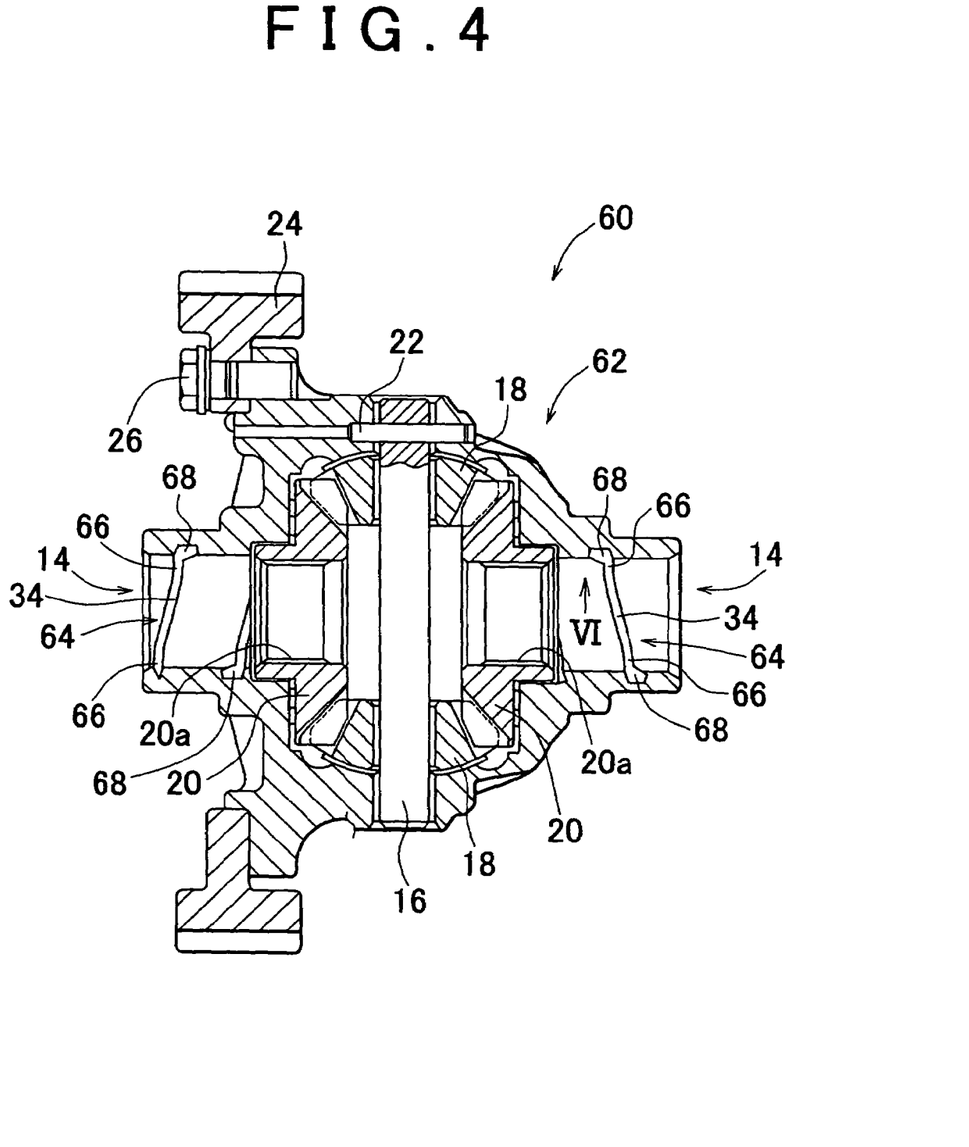
FIG. 4 is a sectional view of a differential gear unit according to a second exemplary embodiment of the invention, which corresponds to FIG. 1 of the first exemplary embodiment.

FIG. 4 is a sectional view of a differential gear unit according to the second exemplary embodiment of the invention, which corresponds to FIG. 1 of the first exemplary embodiment. The second exemplary embodiment differs from the first exemplary embodiment only in terms of the structure of the lubrication groove formed in the differential case.

Figure 5:
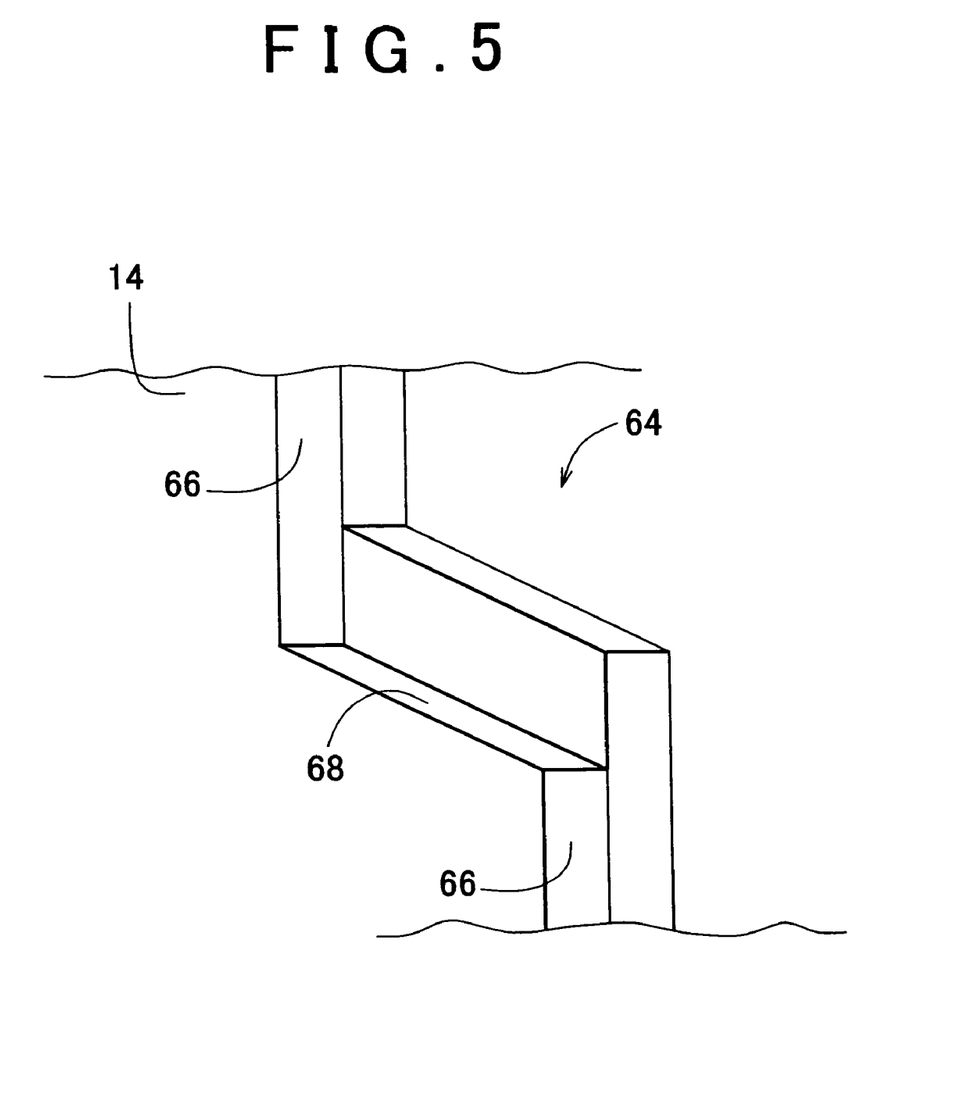
FIG. 5 is an enlarged sectional view of a lubrication groove according to the second exemplary embodiment.

A lubrication groove 64 has the first connecting groove portion 34, just like the lubrication groove 30 in the first exemplary embodiment. However, a perpendicular groove portion 66 in the second exemplary embodiment is structured such that the perpendicular groove portion 32 of the first exemplary embodiment is separated into two parts at the center plane. That is, the location of the end of the perpendicular groove portion 66 on the first connecting groove portion 34 side is similar to that in the first exemplary embodiment, while the other end of the perpendicular groove portion 66 is on the center plane (i.e., is on the plane that includes the axial centers of the insertion holes 14 and the pinion gear shaft 16). As shown in FIG. 5, which is an enlarged front view of the lubrication groove 64, adjacent perpendicular groove portions 66 are each formed at different positions in the axial direction of the insertion holes 14. Further, second connecting groove portions 68 which connect the ends of the perpendicular groove portions 66 on the center plane side are formed in the lubrication groove 64.

Figure 6:
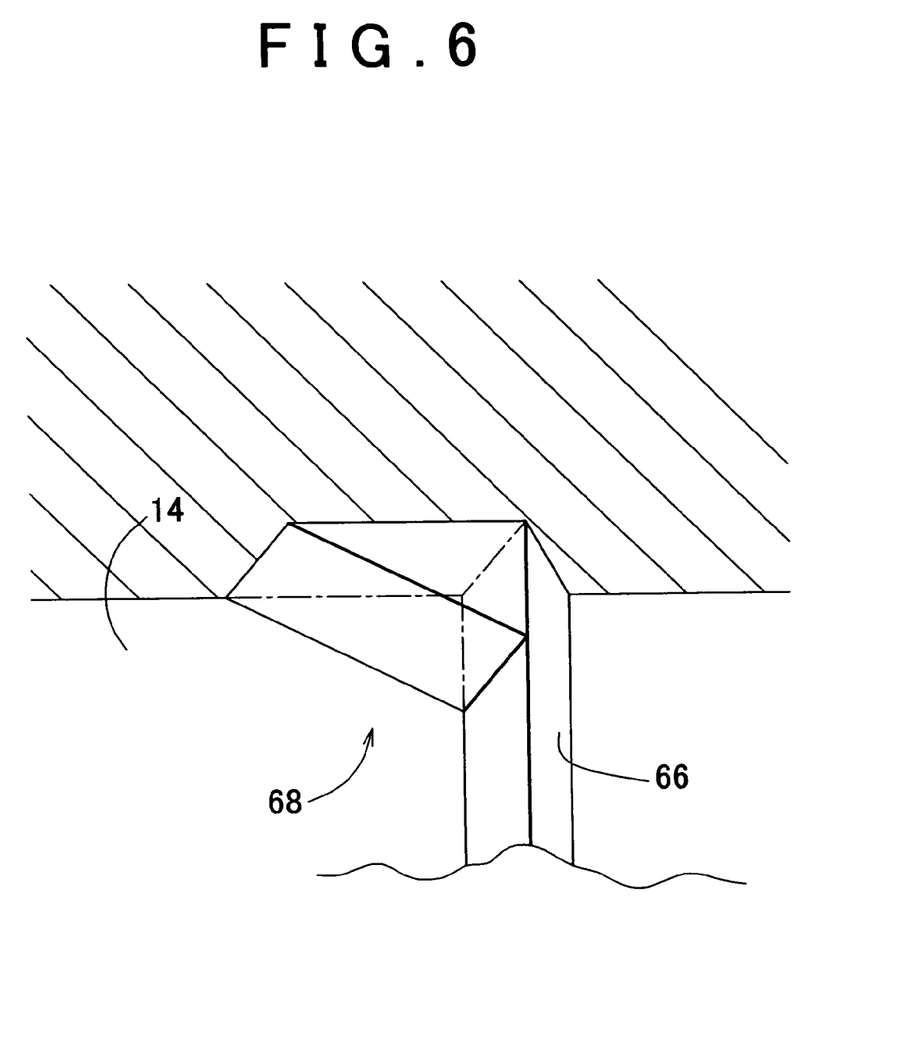
FIG. 6 is a perspective view of a portion of differential gear unit in the direction of arrow VI in FIG. 4.

FIG. 6 is a perspective view of a portion of differential gear unit in the direction of arrow VI in FIG. 4. As shown in the drawing, the second connecting groove portion 68 is such that the area of a cross-section that is parallel with the center plane becomes smaller farther away from the center plane. Also, as shown in the drawing, the lower half of the second connecting groove portion 68 cut by the center plane is a wedge-shaped groove, with the shape of a cross-section parallel to the center plane being rectangular, the shape of a cross-section perpendicular to the axial center of the insertion hole 14 also being rectangular, and the area of a cross-section that is perpendicular to the axial center of the insertion hole 14 becoming larger toward the perpendicular groove portion 66 side. The shape of the upper half of the second connecting groove portion not shown in FIG. 6 is the same as that of the lower half of the second groove portion 68 in FIG. 6.

Figure 7A:
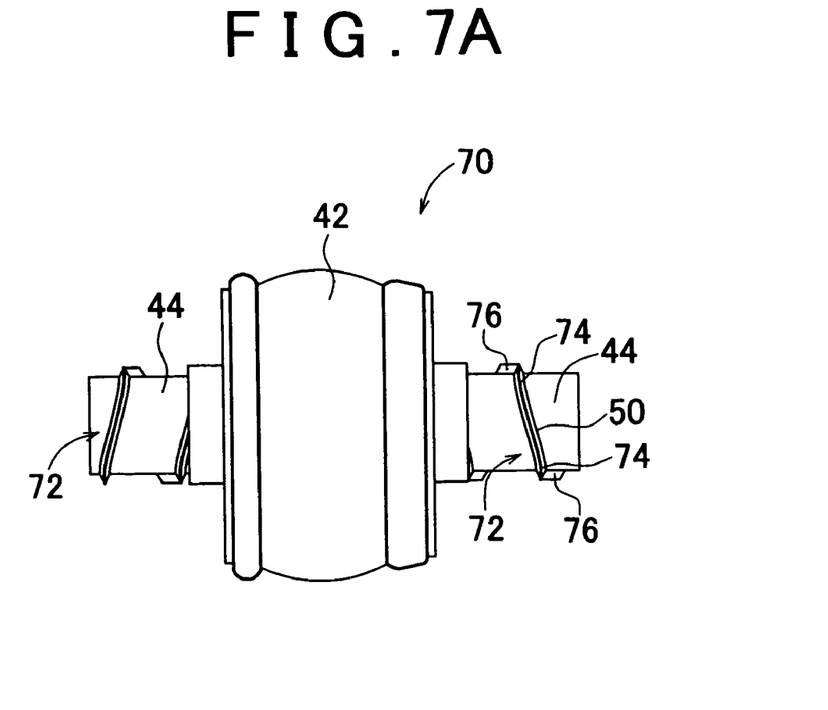
FIG. 7A is a plan view of a core used in casting the differential case according to the second exemplary embodiment.
Figure 7B:
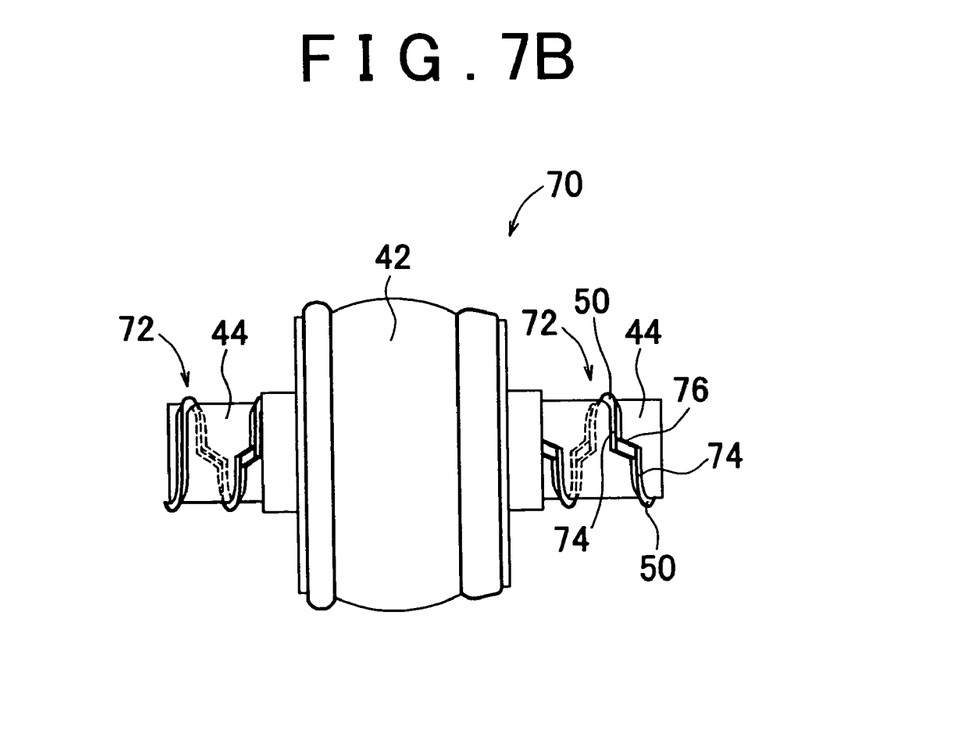
FIG. 7B is a front view of the same.

FIG. 7A is a plan view of a core 70 used in casting a differential case 62 according to the second exemplary embodiment, and FIG. 7B is a front view of the same.

In order to form the lubrication groove 64, a projection 72 formed on each of the cylindrical portions 44 of the core 70 includes perpendicular projecting portions 74 able to fit into the perpendicular groove portions 66 of the lubrication groove 64, first connecting projecting portions 50 able to fit into the first connecting groove portions 34 of the lubrication groove 64, and second connecting groove portions 76 able to fit into the second connecting groove portion 68 of the lubrication groove 64.

When forming the core 70 with a die, not shown, that separates into an upper die and a lower die, each of which has an abutment surface that corresponds to the center plane, i.e., that includes the axial center of the core 70 and divides the second connecting projecting portions 76 into two, the perpendicular projecting portions 66 and the first connecting projecting portions 50 do not interfere with the die, as described in the first exemplary embodiment. Also, although the second connecting projecting portions 76 are not perpendicular with respect to the abutment surfaces of the dies, the second connecting projecting portions 76 are formed so as to intersect those abutment surfaces, i.e., so as to intersect openings in the dies, and the area of the cross-section that is parallel to those abutment surfaces becomes smaller farther away from those abutment surfaces, so the second connecting projecting portions 76 do not interfere with the dies either.

According to the foregoing second exemplary embodiment, the core 70 is used to cast the differential case 62. A die is used to cast the core 70. This die is separated into an upper die and a lower die by a plane corresponding to the center plane of the differential case 62, which includes the axial center of the insertion hole 14 and which lies between an abutment surface of the upper die and a corresponding abutment surface of the lower die. When the core 70 is moved perpendicularly relative to the abutment surfaces of the upper and lower dies in order to extract it from the die, the core 70 is able to be extracted from the die without a projection 72, which was formed on the core 70 in order to form the lubrication groove 64, interfering with the lubrication groove formed in the die. Accordingly, using this core 70 when casting the differential case 62 enables a groove to be formed which allows lubricant to travel in the axial direction by the rotational force of the shaft, thereby reducing manufacturing costs.

Also, according to the second exemplary embodiment, forming the second connecting groove portion 68 in addition to the first connecting groove portion 50 in the lubrication groove 64 makes it easier for the lubricant to be carried in the axial direction by rotation of the output shaft.

Although the invention has been described herein with reference to specific embodiments, many modifications and variations therein will readily occur to those skilled in the art. Accordingly, all such variations and modifications are included within the intended scope of the invention.

For example, the invention can also be applied to other kinds of differential gear units other than the kind illustrated by the foregoing exemplary embodiments. Further, the invention can also be applied to a rotating shaft support apparatus other than a differential gear unit. Also, the invention can also be applied to an apparatus manufactured by forging.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A rotating shaft support apparatus which includes a case that supports a rotating shaft via a structure in which the rotating shaft can rotate relative to the case, comprising:
   a support portion in which an insertion hole, into which the rotating shafts is inserted, is formed;
   a lubrication groove made during casting of the case and formed in the insertion hole, wherein the lubrication groove has at least two windings around a circumference of the insertion hole while advancing in the axial direction of the insertion hole and includes at least one perpendicular groove portion for each winding around the circumference of the insertion hole,
   wherein the perpendicular groove portion i) is farther to the outside than a perpendicular plane that is perpendicular to a center plane of the case on which lies the axial center of the insertion hole, the perpendicular plane including a line of intersection of the center plane and the insertion hole, and ii) is parallel to a plane which is perpendicular to the axial center of the insertion hole, and
   wherein each winding of the lubrication groove has an area of a cross-section that varies along a length of the groove.

2. The differential gear unit according to claim 1, wherein the lubrication groove is structured such that a plurality of the perpendicular groove portions are all formed in different positions in the axial direction of the insertion hole and a first connecting groove portion formed at a portion that does not intersect the center plane connects the plurality of perpendicular groove portions together.

3. The differential gear unit according to claim 2, wherein the perpendicular groove portion has two ends and is structured such that one end thereof is connected to the first connecting groove and the other end lies on or close to the center plane, and a second connecting groove portion, which connects the ends, on the center plane side, of adjacent perpendicular groove portions together and in which an area of a cross-section parallel to the center plane becomes smaller farther away from the center plane, is formed in the lubrication groove.

4. A differential gear unit comprising:
   a differential case having an insertion hole into which is inserted an output shaft, the differential case revolving around the axial center of the insertion hole;
   a pinion gear housed inside the differential case; and
   left and right side gears arranged about a rotational axis of the differential case,
   wherein rotational driving force of the differential case is transmitted, and torque distributed, to the left and right side gears via the pinion gear; a lubrication groove has at least two windings around a circumference of the insertion hole while advancing in the axial direction of the insertion hole includes at least one perpendicular groove portion for each winding around the circumference of the insertion hole and is made during casting of the case and is formed in the insertion hole; and the perpendicular groove portion i) is farther to the outside than a perpendicular plane that is perpendicular to a center plane of the case on which lies the axial center of the insertion hole, the perpendicular plane including a line of intersection of the center plane and the insertion hole, and ii) is parallel to a plane which is perpendicular to the axial center of the insertion hole, and wherein each winding of the lubrication groove has an area of a cross-section that varies along a length of the groove.

5. The differential gear unit according to claim 4, wherein the lubrication groove is structured such that a plurality of the perpendicular groove portions are all formed in different positions in the axial direction of the insertion hole and a first connecting groove portion formed at a portion that does not intersect the center plane connects the plurality of perpendicular groove portions together.

6. The differential gear unit according to claim 5, wherein the perpendicular groove portion has two ends and is structured such that one end thereof is connected to the first connecting groove and the other end lies on or close to the center plane, and a second connecting groove portion, which connects the ends, on the center plane side, of adjacent perpendicular groove portions together and in which an area of a cross-section parallel to the center plane becomes smaller farther away from the center plane, is formed in the lubrication groove.

* * * * *